(12) United States Patent
Chen et al.

(10) Patent No.: US 10,131,009 B2
(45) Date of Patent: Nov. 20, 2018

(54) CONTINUOUS MACHINING SYSTEM

(71) Applicant: METAL INDUSTRIES RESEARCH & DEVELOPMENT CENTRE, Kaohsiung (TW)

(72) Inventors: Hung-Yi Chen, Kaohsiung (TW); Jung-Chou Hung, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 16 days.

(21) Appl. No.: 15/641,601

(22) Filed: Jul. 5, 2017

(65) Prior Publication Data

US 2017/0297127 A1    Oct. 19, 2017

Related U.S. Application Data

(63) Continuation-in-part of application No. 14/073,089, filed on Nov. 6, 2013.

(30) Foreign Application Priority Data

Jul. 18, 2013  (TW) .............................. 102125831 A

(51) Int. Cl.
*B23H 3/00* (2006.01)
*B23H 5/06* (2006.01)
*B23H 7/12* (2006.01)
*B23H 11/00* (2006.01)
*B21J 9/02* (2006.01)

(52) U.S. Cl.
CPC .................. *B23H 5/06* (2013.01); *B21J 9/02* (2013.01); *B23H 3/00* (2013.01); *B23H 7/12* (2013.01); *B23H 11/00* (2013.01)

(58) Field of Classification Search
None
See application file for complete search history.

(56) References Cited

U.S. PATENT DOCUMENTS

| 3,314,137 | A | * | 4/1967 | Schellens | .................... B21J 5/02 29/413 |
| 3,723,269 | A | * | 3/1973 | Hofling | ................ B21D 51/383 205/666 |
| 2004/0212269 | A1 | * | 10/2004 | Decristofaro | ....... H01F 1/15375 310/216.065 |

FOREIGN PATENT DOCUMENTS

| GB | 795655 | A | * | 5/1958 | ................ C25F 3/02 |
| GB | 795656 | A | * | 5/1958 | ................ C25F 3/02 |

* cited by examiner

*Primary Examiner* — Brian W Cohen
(74) *Attorney, Agent, or Firm* — Rosenberg, Klein & Lee

(57) ABSTRACT

The present invention provides a continuous machining system, which comprises an electrochemical machining module, a separating module, and a vibration reducing module. The electrochemical machining module performs an electrochemical machining to a material strip for forming a plurality of components on the material strip. The separating module separates the plurality of components from the material strip. Thereby, the machining time is saved, and thus achieving the purposes of continuous machining and mass production. The vibration reducing module is located between the electrochemical machining module and the separating module. The vibration reducing module can ease the vibration of the material strip. Consequently, the influence of vibration on the electrochemical machining precision of the material strip machined by the electrochemical machining module may be minimized.

16 Claims, 14 Drawing Sheets

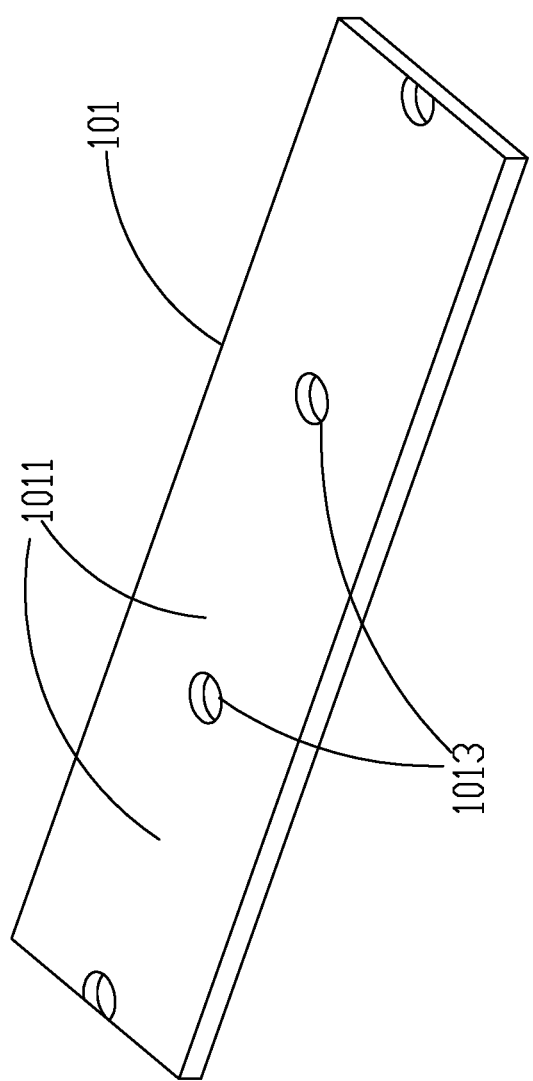

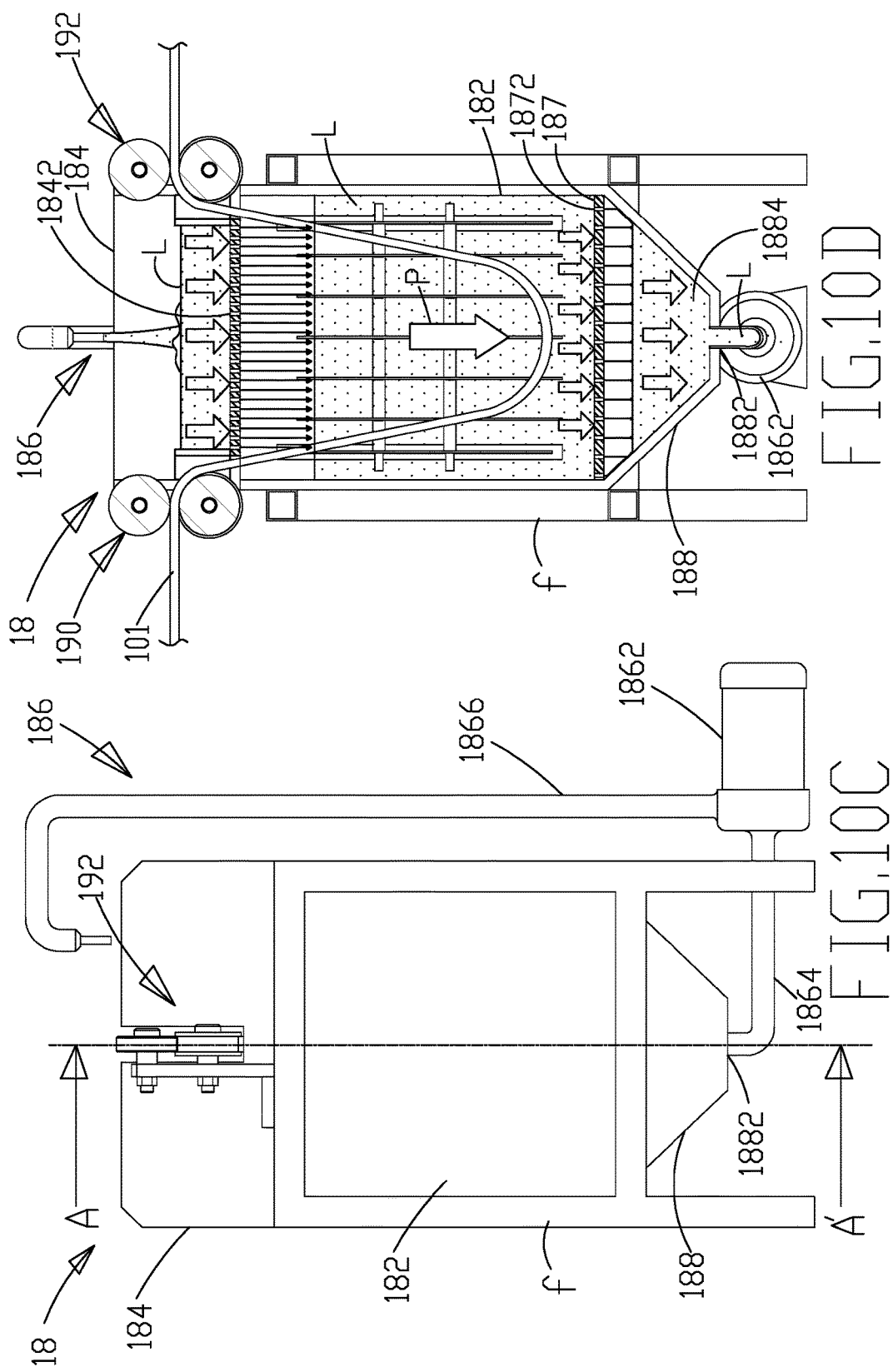

CONTINUOUS MACHINING SYSTEM

CROSS-REFERENCE TO RELATED APPLICATION

This application is being filed as Continuation-In-Part application of Ser. No. 14/073,089, filed on 6 Nov. 2013, currently pending, which claims the benefit of Taiwan Patent Application No. 102125831, filed on 18 Jul. 2013, which is incorporated by reference herein.

FIELD OF THE INVENTION

The present invention relates generally to a machining system, and particularly to a continuous machining system.

BACKGROUND OF THE INVENTION

Owing to people's requirement for convenience in usage, electronic products are developing in the trend of miniaturization. In order to install a great amount of components in miniature electronic products without compromising performance, the most direct method is to shrink the volume of the components, leading to substantial increase for demand of miniature components. The fabrication process of miniature components is quite difficult; the structural rigidity of components is reduced after miniaturization. In addition, it is more challenging to assemble miniature components into miniature electronic products, resulting in higher assembly complexity.

In order to improve the problems described above, multiple-piece components are mostly integrated to an integral component in current designs. Thereby, the assembly procedure is reduced and the assembly accuracy of components in electronic products is enhanced as well. Besides, materials with higher rigidity, such as stainless steel, are adopted for manufacturing the components in order to increasing the structural strength and wear resistance.

Stainless steel is a material hard to be processed. If stainless steel is adopted as the material for the components, CNC milling and cutting is mostly adopted. Nonetheless, it requires a great deal of labor and processing machines for mass production. If a thinner stainless-steel material is used for the components, the etching processing method is adopted presently for producing components. Nonetheless, this method is limited by costly equipment, complicated processing procedures, and insufficient continuity in the fabrication process. According to the above description, none the processing methods described above can meet the requirements of mass production for electronic products. Although forging can be used for soft materials such as copper for achieving the purpose of mass production, for the materials with high hardness, press forging generates a great deal of stress, which introduces the concern of deformation in the sizes of the components.

Accordingly, the present invention provides a continuous machining system for solving the problems described above and achieving the purposes of continuous machining and mass production.

SUMMARY

An objective of the present invention is to provide a continuous machining system. The present invention uses an electrochemical machining method to machine the material strip for reducing stress generation in the material strip and reducing deformation factors of the component formed on the material strip. Thereby, the machining accuracy and the surface quality may be improved.

Another objective of the present invention is to provide a continuous machining system. The present invention combines electrochemical machining and forging process. The electrochemical machining machines the material strip and reduces the thickness of the material strip for reducing wear on molds as well as stress generation during the forging process. Thereby, the machining accuracy may be improved. In addition, by using the electrochemical machining, miniature components can be formed.

A further objective of the present invention is to provide a continuous machining system, which comprises a vibration reducing module. The vibration reducing module can reduce vibration of the material strip. Thereby, during the electrochemical machining, the material strip can be free from excessive vibration.

The present invention discloses a continuous machining system, which comprises an electrochemical machining module, a separating module, and a vibration reducing module. The electrochemical machining module performs an electrochemical machining to a material strip for forming a plurality of components on the material strip. The separating module separates the plurality of components from the material strip. The vibration reducing module is located between the electrochemical machining module and the separating module, and includes a vibration reducing tank and a top tank. The vibration reducing tank accommodates a liquid. The material strip is hung in the vibration reducing tank and immersed in the liquid. A plurality of liquid draining holes are located at the bottom of the vibration reducing tank. The top tank is located on the top of the vibration reducing tank. A plurality of liquid supplying holes are located at the bottom of the top tank and communicating with the vibration reducing tank. The liquid flows downwards to the vibration reducing tank via the plurality of liquid supplying holes at the bottom of the top tank. The liquid is further drained from the vibration reducing tank via the plurality of liquid draining holes at the bottom of the vibration reducing tank.

BRIEF DESCRIPTION OF THE DRAWINGS

FIG. 6A shows a schematic diagram of the material strip according to the second embodiment of the present invention;

FIG. 10C shows a side view of the vibration reducing module according to the third embodiment of the present invention;

FIG. 10D shows a cross-sectional view along the AA' direction in FIG. 10C according to the present invention;

DETAILED DESCRIPTION

In order to make the structure and characteristics as well as the effectiveness of the present invention to be further understood and recognized, the detailed description of the present invention is provided as follows along with embodiments and accompanying figures.

The present invention provides a continuous machining system, which uses an electrochemical machining method for machining materials with high hardness for reducing the stress in the produce generated during machining. Thereby, deformation of the machined products may be prevented. Besides, the present invention adopts the material strip as the machining base material and supplies the material strip continuously for performing the electrochemical machining. Thereby, manual placement of machining base materials may be reduced, which increase the machining speed and thus achieving the purposes of continuous machining and mass production.

Figure 1:
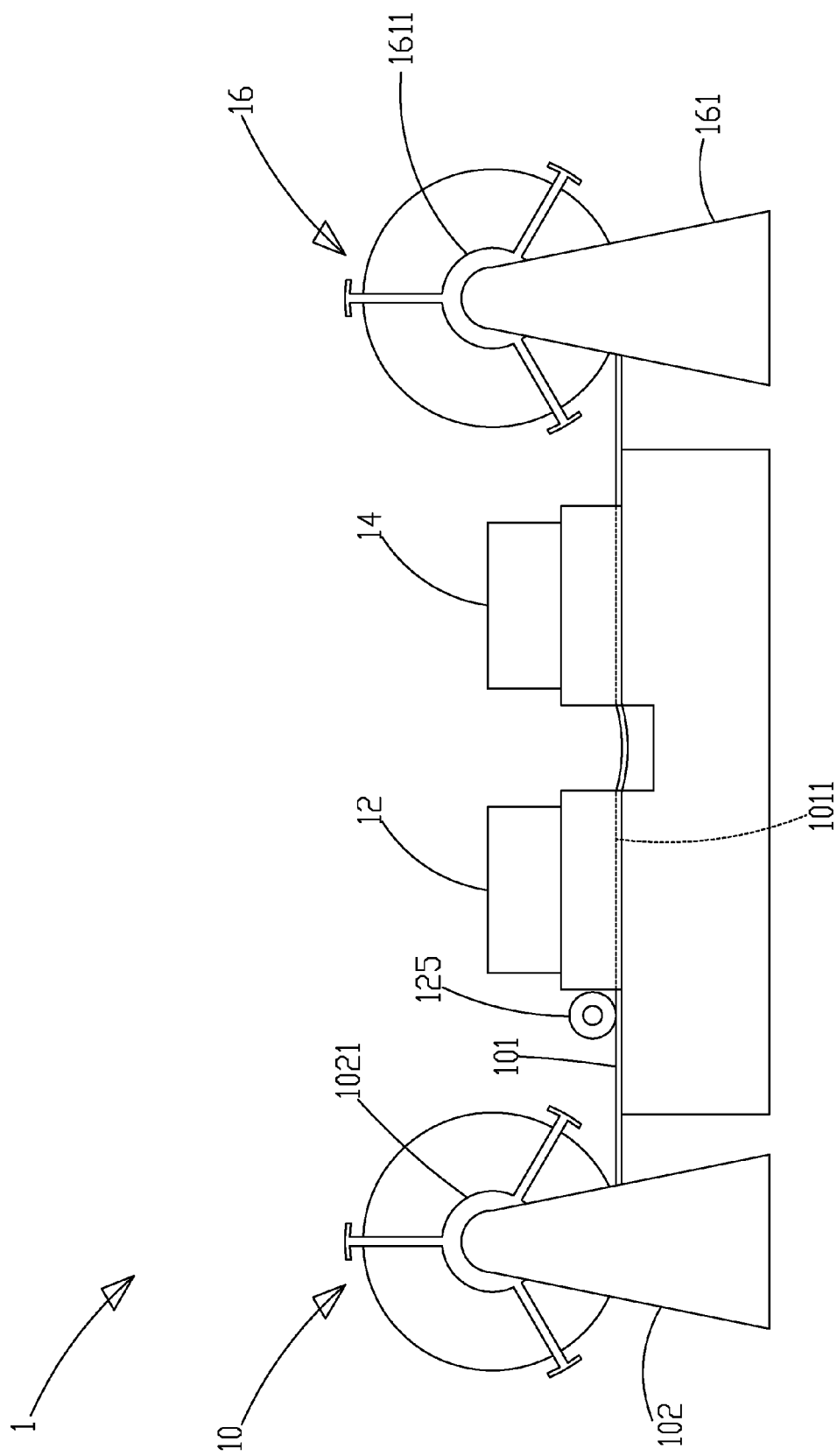
FIG. 1 shows a schematic diagram of the continuous machining system according to the first embodiment of the present invention.
Figure 2:
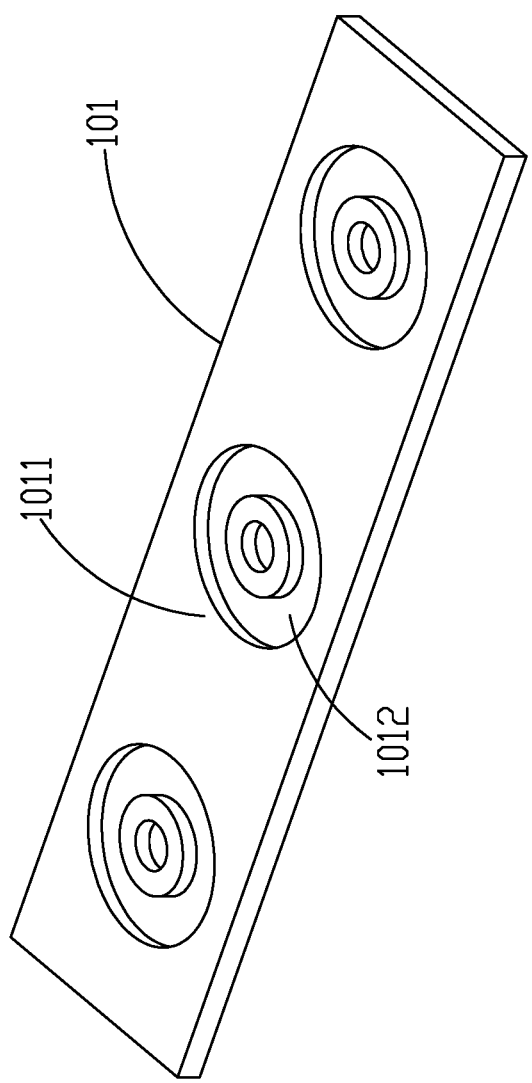
FIG. 2 shows a schematic diagram of the material strip after the electrochemical machining according to the first embodiment of the present invention.
Figure 3:
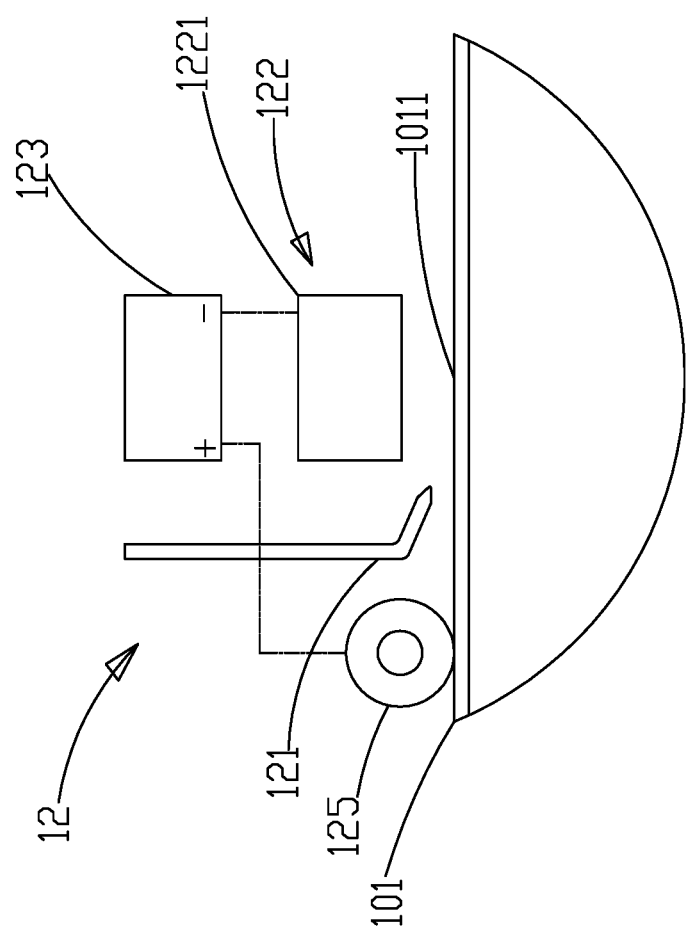
FIG. 3 shows a schematic diagram of the electrochemical machining module according to the first embodiment of the present invention.

Please refer to FIG. 1 and FIG. 2, which show a schematic diagram of the continuous machining system and a schematic diagram of the material strip after the electrochemical machining according to the first embodiment of the present invention. As shown in the figures, the present embodiment provides a continuous machining system 1, which comprises a feeding module 10 and an electrochemical machining module 12. The feeding module 10 supplies a material strip 101 to the electrochemical machining module 12. The material of the material strip 101 may be any conductive material, for example, stainless steel with high hardness or copper, which is a soft material. According to an embodiment of the present invention, the material strip 101 is adopted as the machining base material and can be supplied continuously to the electrochemical machining module 12 for performing the electrochemical machining. Because the electrochemical machining module 12 adopts the electrolytic machining method, an electrode machining unit 122 of the electrochemical machining module 12, as shown in FIG. 3, can be used for performing the electrochemical machining. Consequently, the machining speed may be improved and the machining efficiency may be enhanced.

The electrochemical machining module 12 performs electrochemical machining to at least a machining region 1011 of the material strip 101 for forming a component 1012 in each machining region 1011. The feeding module 10 supplies the material strip 101 continuously to the electrochemical machining module 12, so that the electrochemical machining module 12 can perform the electrochemical machining continuously on the material strip 101 and forming a plurality of components 1012 on the material strip 101. Thereby, manual placement of the machining base material is no longer required; the purposes of continuous machining and mass production may be achieved and the production costs may be reduced accordingly. In addition, the continuous machining system 1 according to the present embodiment can use the electrochemical machining to machine stainless material strip 101 with high hardness and forming the components 1012 on the material strip 101. In the machining stage, the stress generated by the forging process in the material strip 101 is reduced for avoiding deformation of the plurality of components 1012. Thereby, the machining efficiency may be enhanced and the costs may be reduced. Besides, in comparison with other machining methods, such as etching, according to the prior art, processing the material strip 101 using the electrochemical machining simplifies the photolithography process of etching and the long-time etching process.

The feeding module 10 according to the present embodiment includes a material frame 102, which has a roll 1021. The material strip 101 according to the present embodiment is a rolling strip disposed around the roll 1021. As the roll 1021 of the material frame 102 drives the material strip 101 to rotate, the material frame 102 supplies continuously the material strip 101 to the electrochemical machining module 12. The electrochemical machining module 12 performs the electrochemical machining to the machining regions 1011 of the material strip 101 continuously for forming the plurality of components 1012 on the material strip 101.

FIG. 3 shows a schematic diagram of the electrochemical machining module according to the first embodiment of the present invention. As shown in the figure, the electrochemical machining module 12 comprises an electrolyte supplying unit 121, an electrode machining unit 122, and a power unit 123. According to the present embodiment, the electrolyte supplying unit 121 can be nozzle for injecting electrolyte to the machining region 1011 of the material strip 101 entering the electrochemical machining module 12. In addition, the electrolyte supplying unit 121 can be an electrobath. The machining region 1011 of the material strip 101 entering the electrochemical machining module 12 is immersed in the electrobath. The electrode machining unit 122 includes a machining electrode 1221. There is a gap between the machining electrode 1221 and the material strip 101. The machining electrode 1221 corresponds to the machining region 1011 of the material strip 101. There is a pattern (not shown in the figure) on the surface of the machining electrode 1221 corresponding to machining region 1011 to perform the electrochemical machining for electrolyzing the machining region 1011 of the material strip 101. Hence, a portion of the material of the material strip 101 is removed for forming the components 1012 on the material strip 101.

A positive terminal of the power unit 123 is connected to a conductive wheel 125, which rolls the material strip 101 for supplying the material strip 101 to the electrochemical machining module 12. A negative terminal of the power unit 123 is connected to the machining electrode 1221 of the electrode machining unit 122. When the power unit 123 supplies a power source to the material strip 101 and the electrode machining unit 122, the machining electrode 1221 of the electrode machining unit 122 performs the electrochemical machining to the machining region 1011 of the material strip 101 for forming the components 1012 on the machining region 1011, as shown in FIG. 2. The structure of the component 1012 is complementary to the pattern on the machining electrode 1221. According to an embodiment of the present embodiment, the structure of the component 1012 is a patterned structure without holes.

Refer again to FIG. 1. The continuous machining system 1 according to the present embodiment further comprises a material recovering module 16. Before the continuous machining system starts machining, the material strip 101 supplied by the feeding module 10 first passes through the electrochemical machining module 12 for connecting to the material recovering module 16. Like the feeding module 10, the material recovering module 16 includes a material frame 161. The material frame 161 has a roll 1611. One end of the material strip 101 is connected to the roll 1611.

Figure 4:
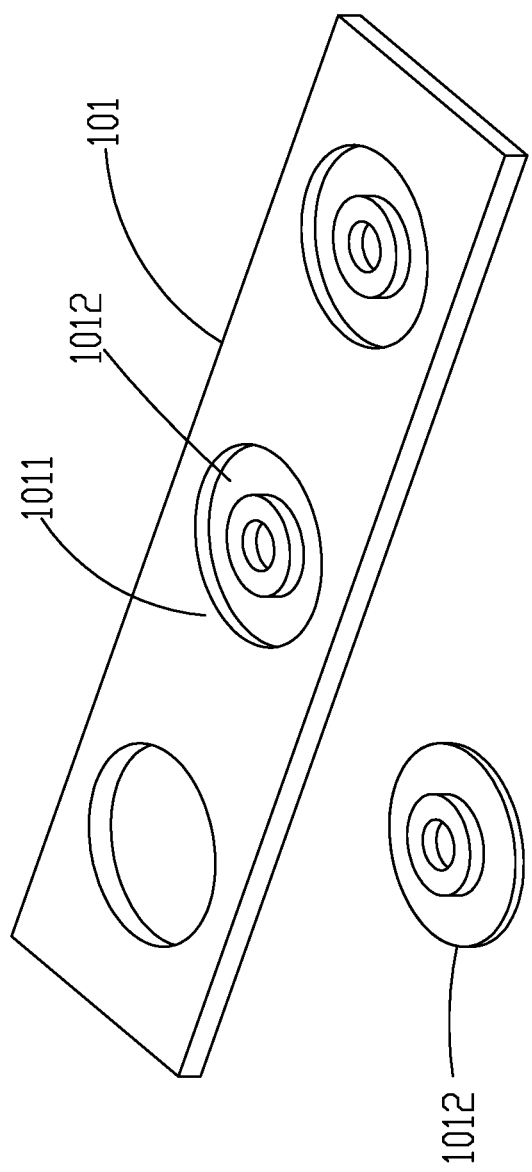
FIG. 4 shows a schematic diagram of the component separated from the material strip according to the first embodiment of the present invention.

The continuous machining system 1 according to the present invention further comprises a separating module 14 for separating the plurality of components 1012 formed on the material strip 101 from the material strip 101. The separating module 14 according to the present embodiment is disposed between the electrochemical machining module 12 and the material recovering module 16. Before the machined material strip 101 is conveyed to the material recovering module 16, the material strip 101 passes through the separating module 14 first. The separating module 14 corresponds to the plurality of components 1012 of the material strip 101 and machines the material strip 101 for separating the components 1012 from the material strip 101, as shown in FIG. 4. The material strip 101 is recovered and rolled by the material recovering module 16. According to the present embodiment, the separating module 14 can perform a forging process on the material strip 101 or the plurality of components 1012 for separating the plurality of components 1012 from the material strip 101. An example of separating the plurality of components 1012 is to take advantage of the fact that the thickness of the material strip 101 at the locations where the plurality of components 1012 is processed by forging is thinner than the thickness of the material strip 101 at the locations without the electrochemical machining. Thereby, during the cutting and stamping processes on the thin material for forming by using the forging process, the processing stress at the processed parts is lowered for preventing raise and bending, which affects the forming precision.

Figure 5:
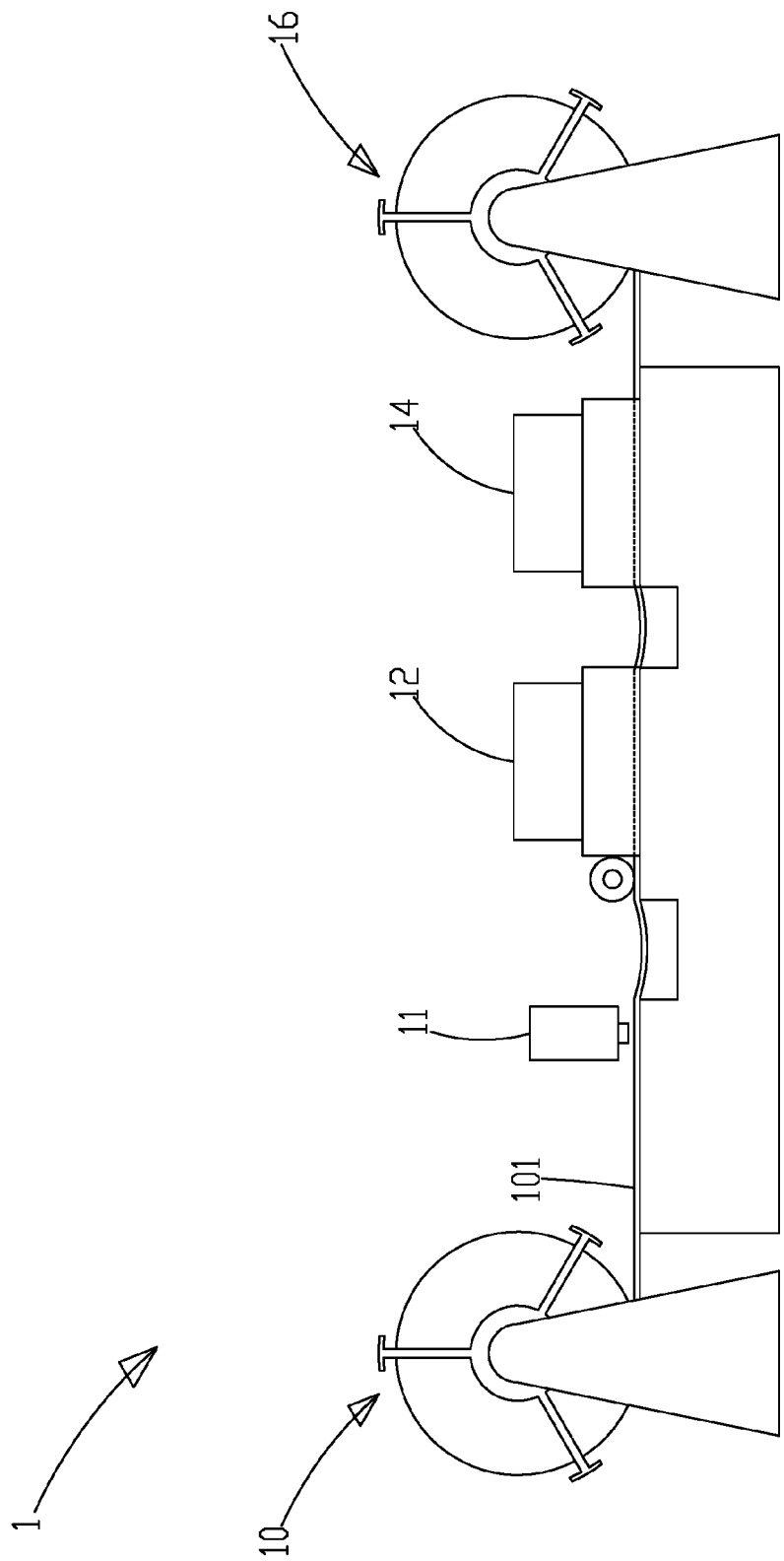
FIG. 5 shows a schematic diagram of the continuous machining system according to the second embodiment of the present invention.
Figure 6B:
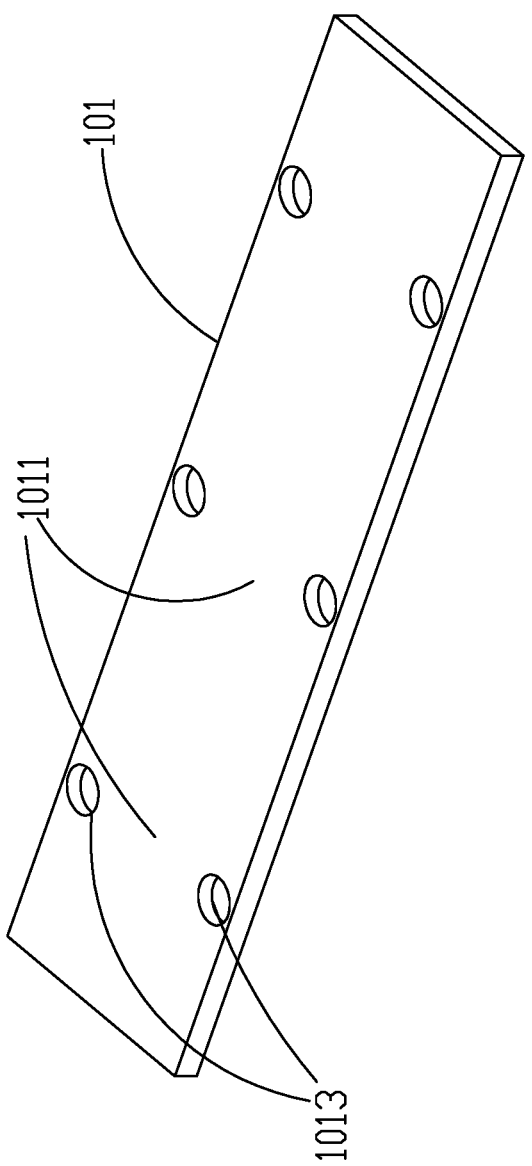
FIG. 6B shows another schematic diagram of the material strip according to the second embodiment of the present invention.

Please refer to FIG. 5, which shows a schematic diagram of the continuous machining system according to the second embodiment of the present invention. As shown in the figure, the continuous machining system 1 according to the present embodiment further comprises a pre-machining module 11 disposed before the electrochemical machining module 12 for performing the pre-machining to the material strip 101 before the electrochemical machining. The pre-machining module 11 is used for forming at least a positioning hole 1013 on both left and right sides or both top and down sides of the machining region 1011 of the material strip 101, as shown in FIGS. 6A and 6B. Hence, the electrochemical machining module 12 can position the machining region 1011 of the material strip 101 according to the positioning hole 1013 for performing the electrochemical machining to the machining region 1011. Depending on the difficulty of machining the material strip 101, laser or forging can be selected for machining the material strip 101 and forming the positioning hole 1013. In addition, the above pre-machining can be performed directly before forming the components 1012 on the material strip 101 by the electrochemical machining module 12. Thereby, the disposition of the pre-machining module 11 can be omitted.

Figure 7:
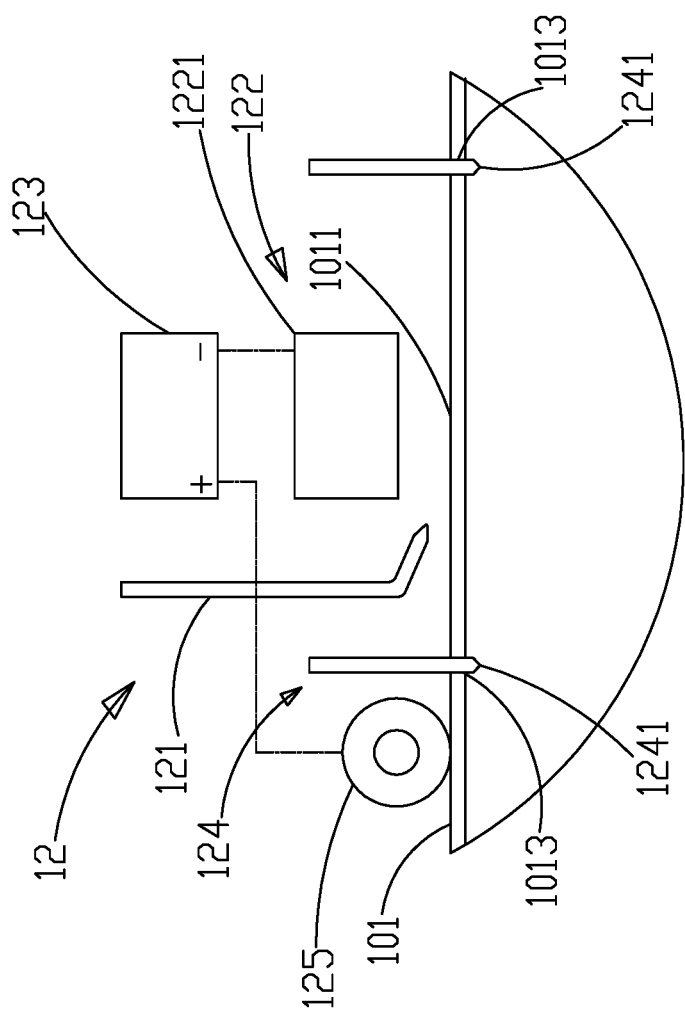
FIG. 7 shows a usage status diagram of the electrochemical machining module according to the second embodiment of the present invention.

Please refer to FIG. 7, which shows a usage status diagram of the electrochemical machining module according to the second embodiment of the present invention. As shown in the figure, the material strip 101 machined by the pre-machining module 11 enters the electrochemical machining module 12. A positioning unit 124 of the electrochemical machining module 12 positions the machining region 1011 of the material strip 101 according to the positioning hole 1013 to make the machining region 1011 correspond to the electrode machining unit 122. Thereby, the electrode machining unit 122 can perform the electrochemical machining to the machining region 1011 accurately and thus forming the component 1012 in the machining region 1011. According to the present embodiment, the positioning unit 124 has at least a positioning pillar 1241 inserting into the positioning hole 1013. Consequently, the machining region 1011 of the material strip 101 can be positioned.

Moreover, the separating module 14 can also have a positioning unit (not shown in the figure). The positioning unit of the separating module 14 is like the positioning unit 124 of the electrochemical machining module 12. Hence, the details will not be described again. The separating module 14 positions the plurality of components 1012 of the machining regions 1011 via the positioning unit to make the plurality of components 1012 correspond to the separating module 14. Thereby, the separating module 14 can separate the plurality of components 1012 from the material strip 101 accurately.

Figure 8:
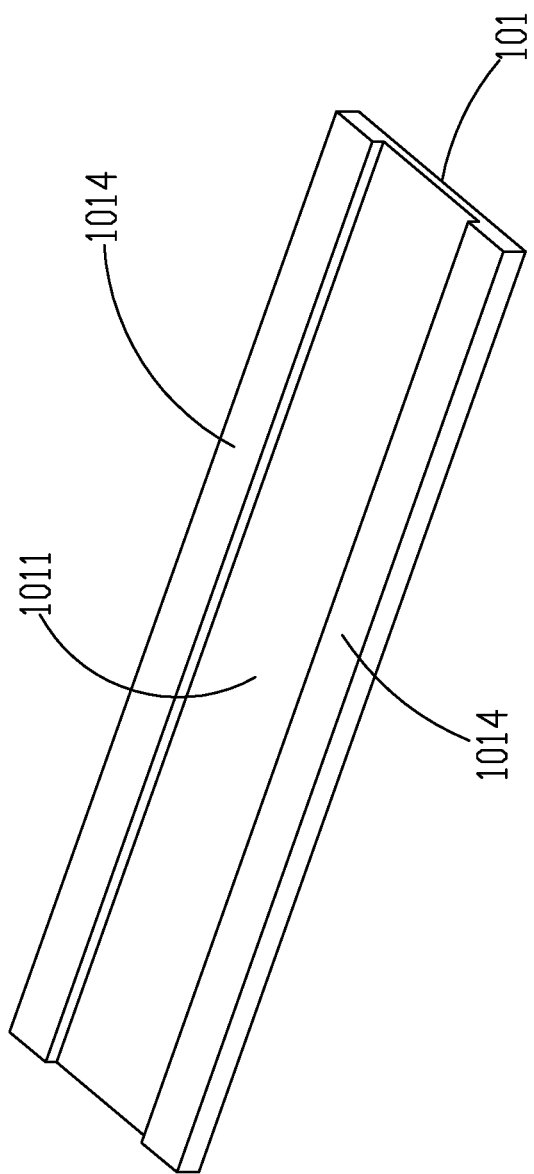
FIG. 8 shows still another schematic diagram of the material strip according to the second embodiment of the present invention.

Please refer again to FIG. 5. Before the electrochemical machining module 12 starts to form the plurality of components 1012, the thickness of the machining regions 1011 of the material strip 101 is reduced first, as shown in FIG. 8. The electrochemical machining module 12 performs the electrochemical machining to the material strip 101 for thinning the machining regions 1011 first. Then, the electrochemical machining module 12 performs the electrochemical machining to the thinned machining regions 1011 for forming the components 1012. Because the electrochemical machining module 12 reduces the thickness of the material strip 101, the processing stress generated by the forging process by the separating module 14 subsequently may be reduced and thus avoiding raise and bending of the material strip 101 due to the processing stress. Accordingly, deformation of the separated components 1012 may be prevented, enhancing effectively the processing precision of the forging process as well as the surface quality. In addition, wear on molds may be reduced.

According to the present embodiment, the electrochemical machining module 12 performs the electrochemical machining to the machining regions 1011 of the whole material strip 101 continuously, as shown in FIG. 8. According to an embodiment, the thickness of the central region of the whole material strip 101 is reduced for reducing the processing stress generated by the separating module 14 during the press forging process. Besides, the electrochemical machining module 12 does not thin all the regions of the while material strip 101. Instead, only the machining regions 1011 are thinned. Thereby, the unthinned regions of the material strip 101 are equivalent to reinforcing ribs 1014, which maintain the strength of the thinned material strip 101 for avoiding the material strip 101 from being extended and breaking during the conveying process. Furthermore, because the electrochemical machining module 12 does not perform the electrochemical machining to the whole machining regions 1011, only regions machined by the electrochemical machining module 12 and the separating module 14 are thinned. It is not necessary to reduce the thickness of the whole machining regions 1011. Thus, the machining efficiency is improved.

Figure 9:
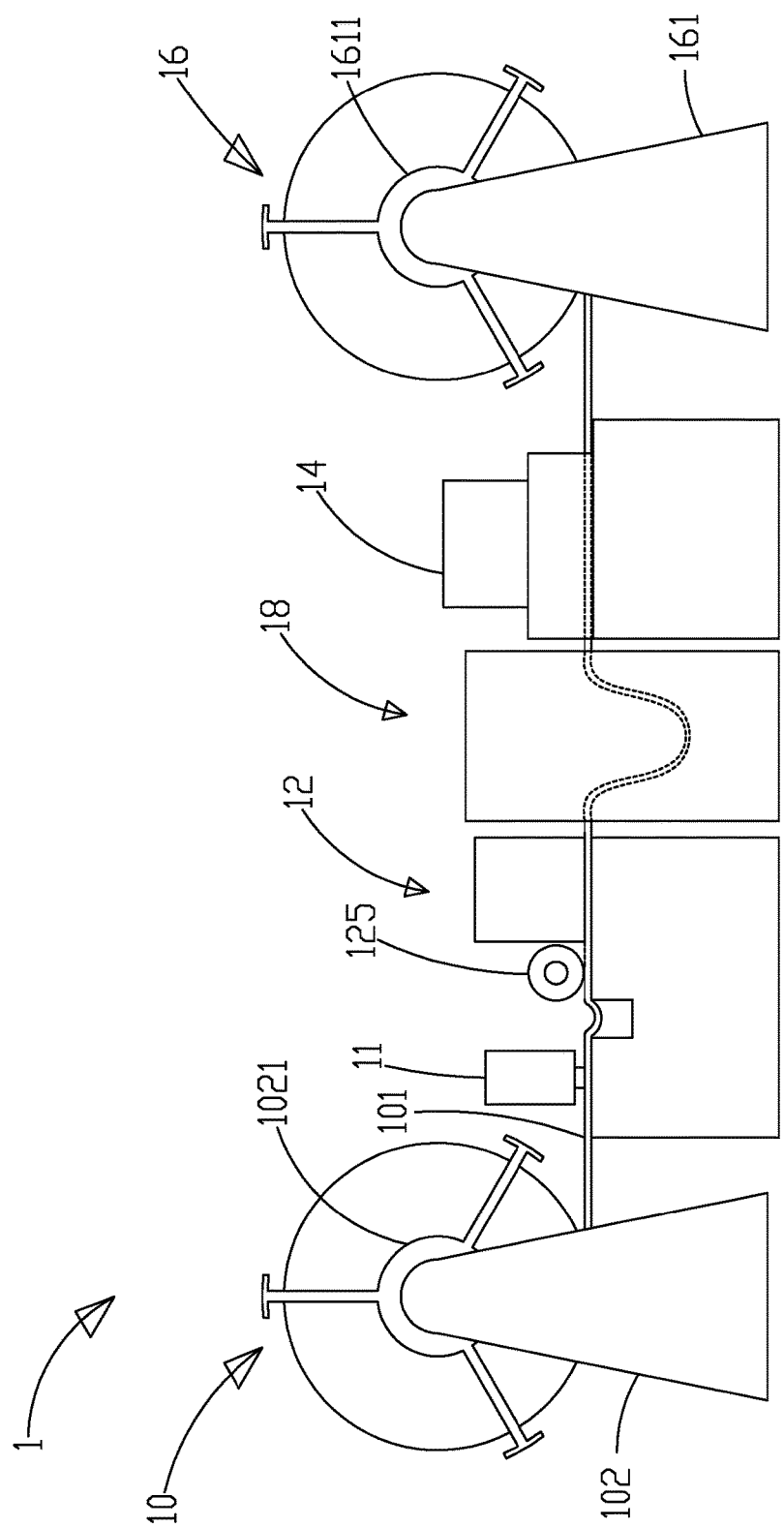
FIG. 9 shows a schematic diagram of the continuous machining system according to the third embodiment of the present invention.

Please refer to FIG. 9, which shows a schematic diagram of the continuous machining system according to the third embodiment of the present invention. As shown in the figure, the difference between the continuous machining system 1 according to the present embodiment and the ones according to the previous embodiments is that the continuous machining system 1 according to the present embodiment further comprises a vibration reducing module 18 located between the electrochemical machining module 12 and the separating module 14. The pre-machining module 11 is still disposed in front of the electrochemical machining module 12. The feeding module 10 supplies the material strip 101 continuously. The material strip 101 passes through the pre-machining module 11, the electrochemical machining module 12, the vibration reducing module 18, and the separating module 14 continuously and rolled by the material recovering module 16. The vibration reducing module 18 according to the present embodiment can ease the vibration caused by the forces applied to the material strip 101. For example, the material strip 101 will vibrate when the separating module 14 performs machining, such as forging process, to the material strip 101. By using the vibration reducing module 18, the vibration of the material strip 101 can be eased. The excessive vibration of the material strip 101 may be avoided during the machining process of the electrochemical machining module 12 to the material strip 101, and therefore the influence of vibration on the electrochemical machining precision of the material strip 101 machined by the electrochemical machining module 12 may be avoided.

Figure 10A:
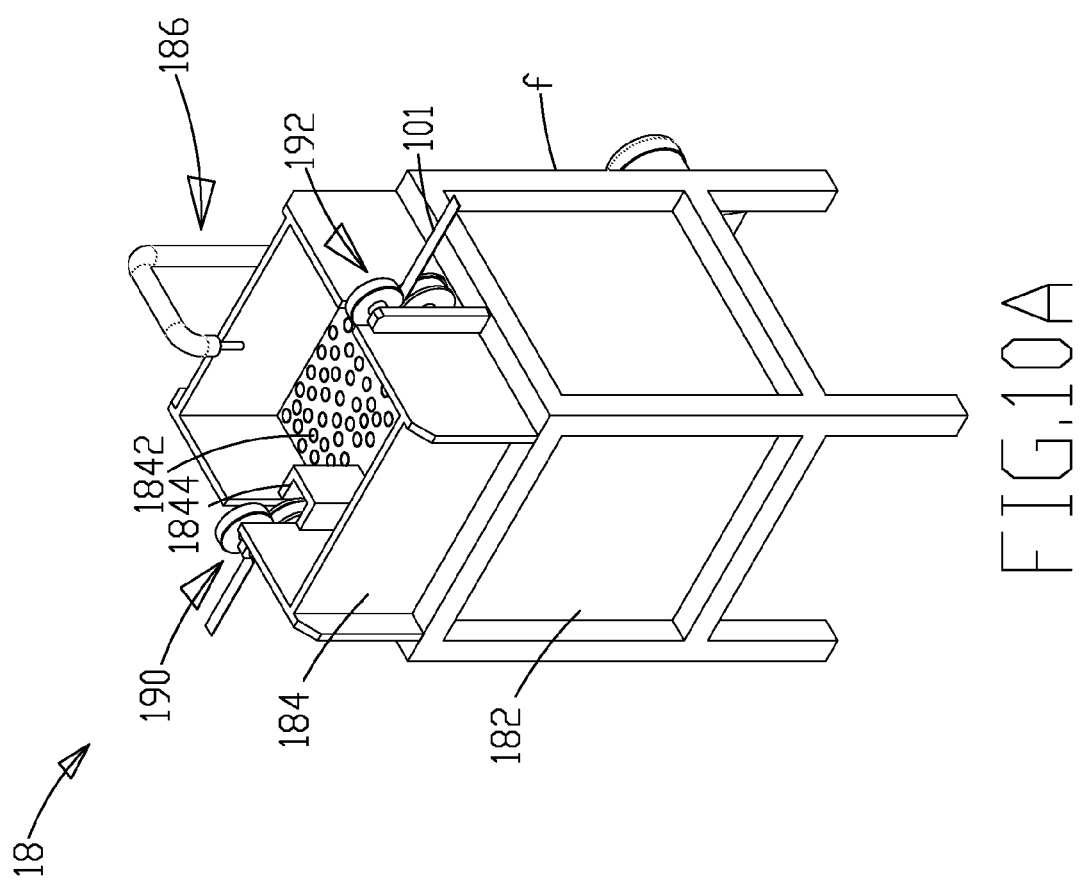
FIG. 10A shows a stereoscopic diagram of the vibration reducing module according to the third embodiment of the present invention.
Figure 10B:
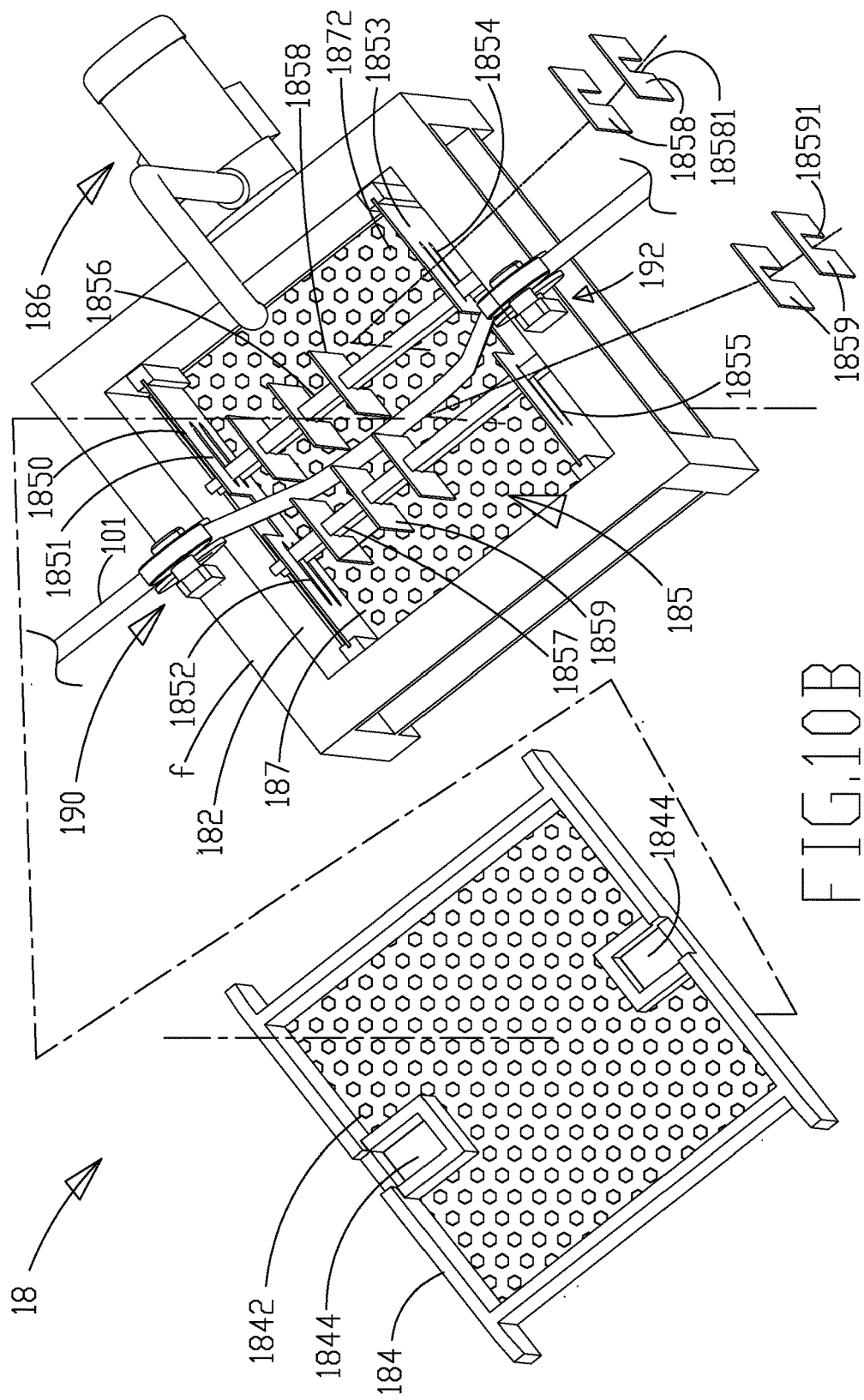
FIG. 10B shows a schematic diagram of the top tank of the vibration reducing module shown in FIG. 10A disassembled from the vibration reducing tank of the vibration reducing module.

Please refer to FIGS. 10A to 10D, which show a stereoscopic diagram of the vibration reducing module, a schematic diagram of the top tank of the vibration reducing module shown in FIG. 10A disassembled from the vibration reducing tank of the vibration reducing module, a side view of the vibration reducing module, and a cross-sectional view along the AA' direction in FIG. 10C according to the third embodiment of the present invention. As shown in FIGS. 10A to 10D, the material strip 101 passes through the vibration reducing module 18 to the separating module 14. The vibration reducing module 18 includes a vibration reducing tank 182, a top tank 184, and a liquid supplying module 186. The vibration reducing tank 182 accommodates a liquid L. The top tank is located on the top of the vibration reducing tank 182. A plurality of liquid supplying holes 1842 are located at the bottom of the top tank 184 and communicating with the vibration reducing tank 182. A plurality of liquid draining holes 1872 are located at the bottom of the vibration reducing tank 182. The liquid supplying module 186 supplies the liquid L to the top tank 184. According to an embodiment of the present invention, the liquid L can be water or any other liquid. Besides, the top tank 184 may further have two penetrating holes 1844 located on both sides of the top tank 184, respectively. The material strip 101 enters and exits the vibration reducing tank 182 via the penetrating holes 1844 of the top tank 184.

In the process of moving the material strip 101, the material strip 101 enters the vibration reducing tank 182 from a first side of the vibration reducing module 18 and exits the vibration reducing tank 182 from a second side of the vibration reducing module 18 before entering the separating module 14. As shown in FIG. 10D, instead of being straightened, the material strip 101 is hung in the vibration reducing tank 182 in a U shape. Because the material of the material strip 101 is metal, it can be immersed in the liquid L. According to the present embodiment, the vibration reducing module 18 may further includes a frame f disposed outside the vibration reducing tank 182 for supporting the vibration reducing tank 182. The liquid supplying module 186 supplies the liquid L to the top tank 184 and the liquid L is then stored in the top tank 184. Since the plurality of liquid supplying holes 1842 located at the bottom of the top tank 184 communicate with the vibration reducing tank 182, the liquid L flows downward to the vibration reducing tank 182 through the plurality of liquid supplying holes 1842. Then the liquid L is drained from the vibration reducing tank 182 via the plurality of liquid draining holes 1872 located at the bottom of the vibration reducing tank 182. According to an embodiment of the present invention, the liquid supplying holes 1842 are distributed nearly uniformly over the bottom of the top tank 184. Alternatively, the liquid supplying holes 1842 are distributed nearly uniformly over the projected region of the material strip 101 and nearby region (not shown in the figures) thereof on the bottom of the top tank 184. The liquid draining holes 1872 are distributed nearly uniformly over the bottom of the vibration reducing tank 182. Alternatively, the liquid draining holes 1872 are distributed nearly uniformly over the projected region of the material strip 101 and nearby region (not shown in the figures) thereof on the bottom of the vibration reducing tank 182. Thereby, the liquid L can flow to the vibration reducing tank 182 nearly uniformly from the top tank 184, and the liquid L can be drained from the vibration reducing tank 182 nearly uniformly. Alternatively, the liquid L can flow to the vibration reducing tank 182 nearly uniformly from the projected region of the material strip 101 and the nearby region thereof on the bottom of the top tank 184. Further, the liquid L can be drained from the vibration reducing tank 182 nearly uniformly from the projected region of the material strip 101 and the nearby region thereof on the bottom of the vibration reducing tank 182.

According to an embodiment of the present invention, the vibration reducing module 18 further includes a liquid draining plate 187 and a bottom tank 188. The bottom tank 188 is disposed at the bottom of the vibration reducing tank 182 and has an outlet 1882. The liquid draining plate 187 is disposed between the bottom tank 188 and the vibration reducing tank 182. The liquid draining plate 187 has the plurality of liquid draining holes 1872. Thereby, the plurality of liquid draining holes 1872 are located at the bottom of the vibration reducing tank 182. In addition, the liquid draining holes 1872 communicate with the vibration reducing tank 182 and the bottom tank 188. Thereby, the liquid L is drained from the vibration reducing tank 182 through the liquid draining holes 1872. The liquid L further flows downward to the bottom tank 188 and is drained from the bottom tank 188 through the outlet 1882 of the bottom tank 188. According to an embodiment of the present invention, the vibration reducing tank 182 and the bottom tank 188 may be formed integrally. Besides, the internal opening of the bottom tank 188 shrinks gradually from the top to the bottom. Namely, the internal accommodating space 1884 of the bottom tank 188 is taper for facilitating concentrating the liquid L to the bottom of the bottom tank 188 and then draining the liquid L from the bottom tank 188.

Please refer again to FIG. 10D. As the material strip 101 is immersed in the liquid L and vibrated by external forces, the force applied by the liquid L to the material strip 101 is equivalent a resistive force. Thereby, the liquid L is equivalent to a damper, which will ease the vibration of the material strip 101 caused by external forces, such as the vibration caused by forging forces supplied to the material strip 101 when the separating module 14 performs the forging process. Therefore, the excessive vibration of the material strip 101 may be avoided during the machining process of the electrochemical machining module 12 to the material strip 101, and the influence of vibration on the machining precision thus may be avoided. Furthermore, thanks to the liquid supplying holes 1842 and the liquid draining holes 1872 of the vibration reducing module 18, the liquid L can flow continuously to the bottom of the vibration reducing tank 182 form the top of the vibration reducing tank 182. Therefore, a flowing pressure P is generated and applied continuously to the material strip 101, which may facilitate further easing the vibration of the material strip 101 cause by the external forces.

Please refer again to FIG. 10C and FIG. 10D. According to the present embodiment, the liquid supplying module 186 of the vibration reducing module 18 may further include a pump 1862 connected to the outlet 1882 of the bottom tank 188 to draw the liquid L from the bottom tank 188 via the outlet 1882 for supplying the liquid L to the top tank 184. The liquid L flows to the vibration reducing tank 182 again through the liquid supplying holes 1842 and to the bottom tank 188 through the liquid draining holes 1872. Thereby, the liquid L can maintain circulating and thus saving the usage of the liquid L. According to the present embodiment, the liquid supplying module 186 may further include two pipes 1864 and 1866. The pipe 1864 is connected between the outlet 1882 of the bottom tank 188 and the inlet of the pump 1862. One end of the pipe 1866 is connected to the outlet of the pump 1862 while the opening of the other end of the pipe 1866 is opposing to the opening of the top tank 184 for supplying the liquid L to the top tank 184.

According to an embodiment of the present invention, the pump 1862 is not required to be connected to the bottom tank 188. Instead, the pump 1862 is connected to an external storage tank (not shown in the figures) for drawing the liquid L from the storage tank and supplying to the top tank 184. In addition, the vibration reducing module 182 can exclude the bottom tank 188. The liquid L can be drained directly from the vibration reducing module 182 via the liquid draining holes 1872 located at the bottom of the vibration reducing tank 182.

Moreover, the vibration reducing module 18 may further include a limiting module 185 disposed inside the vibration reducing tank 182 and on both sides of the conveying path of the material strip 101. It means that the limiting module 185 can limit the material strip 101 to move along the conveying path only and thus preventing the material strip 101 from deviating from the conveying path.

The limiting module 185 may include a first fixing plate 1850, a second fixing plate 1853, two first positioning pillars 1856, two second positioning pillars 1857, a plurality of first limiting plates 1858, and a plurality of second limiting plates 1859. The first fixing plate 1850 is disposed on the inner sidewall of the vibration reducing tank 182 and located on the first side of the vibration reducing tank 182. The first fixing plate 1850 has two first positioning grooves 1851 and two second positioning grooves 1852. The two first positioning grooves 1851 are arranged from top to bottom and located on the first side of the conveying path of the material strip 101; the two second positioning grooves 1852 are arranged from top to bottom and located on the second side of the conveying path of the material strip 101. The second fixing plate 1853 is disposed on the inner sidewall of the vibration reducing tank 182 and located on the second side of the vibration reducing tank 182. The second fixing plate 1853 has two first positioning grooves 1854 and two second positioning grooves 1855. The two first positioning grooves 1854 are arranged from top to bottom and located on the first side of the conveying path of the material strip 101; the two second positioning grooves 1855 are arranged from top to bottom and located on the second side of the conveying path of the material strip 101. The first positioning grooves 1851 are opposing to the first positioning grooves 1854; the second positioning grooves 1852 are opposing to the second positioning grooves 1855.

Two first positioning pillars 1856 are arranged from top to bottom, disposed inside the vibration reducing tank 182, and located on the first side of the conveying path of the material strip 101. The first ends of the two first positioning pillars 1856 pass through the two first positioning grooves 1851 of the first fixing plate 1850, respectively; the second ends of the two first positioning pillars 1856 pass through the two first positioning grooves 1854 of the second fixing plate 1853, respectively. The plurality of first limiting plates 1858 are disposed at the two first positioning pillars 1856. Two second positioning pillars 1857 are arranged from top to bottom, disposed inside the vibration reducing tank 182, and located on the second side of the conveying path of the material strip 101. The first ends of the two second positioning pillars 1857 pass through the two second positioning grooves 1852 of the first fixing plate 1850, respectively; the second ends of the two second positioning pillars 1857 pass through the two second positioning grooves 1855 of the second fixing plate 1853, respectively. The plurality of second limiting plates 1859 are disposed at the two second positioning pillars 1857. By using the first limiting plates 1858 and the second limiting plates 1859 on both sides of the conveying path of the material strip 101, the material strip 101 is limited to move along the conveying path only. The first limiting plates 1858 and the second limiting plates 1859 have openings 18581 and 18591, respectively, and making them U-shaped. Therefore, the first limiting plates 1858 and the second limiting plates 1859 can straddle the first positioning pillars 1856 and the second positioning pillars 1857, respectively. That is allowing the first positioning pillars 1856 and the second positioning pillars 1857 to pass through the first limiting plates 1858 and the second limiting plates 1859, respectively.

Both ends of the first positioning pillars 1856 can move in the first positioning grooves 1851 and 1854; both ends of the second positioning pillars 1857 can move in the second positioning grooves 1852 and 1855. Thereby, the spacing between the first positioning pillars 1856 and the second positioning pillars 1857 can be adjusted according to the width of the material strip 101. That is, the spacing between the first limiting plates 1858 and the second limiting plates 1859 can be adjusted according to the width of the material strip 101. According to an embodiment of the present invention, the first fixing plate 1850 and the second fixing plate 1853 may not be required for the limiting module 185. The first positioning pillars 1856 and the second positioning pillars 1857 can be disposed on the inner sidewall of the vibration reducing tank 182 directly.

In addition, the continuous machining system 1 according to the present embodiment further comprises a plurality of guiding modules 190, 192 disposed on both sides of the vibration reducing module 18, respectively. In other words, the first guiding module 190 is disposed on the first side of the vibration reducing tank 182 and the second guiding module 192 is disposed on the second side of the vibration reducing tank 182. The first guiding module 190 guides the material strip 101 to enter the vibration reducing tank 182 and the second guiding module 192 guides the material strip 101 passing through the vibration reducing tank 182 to enter the separating module 14, and thus avoiding shift of the material strip 101 during the conveying process. The shift will influence the processing precision of the electrochemical machining module 12 and the rolling process of the material recovering module 16.

Figures 11A, 11B:
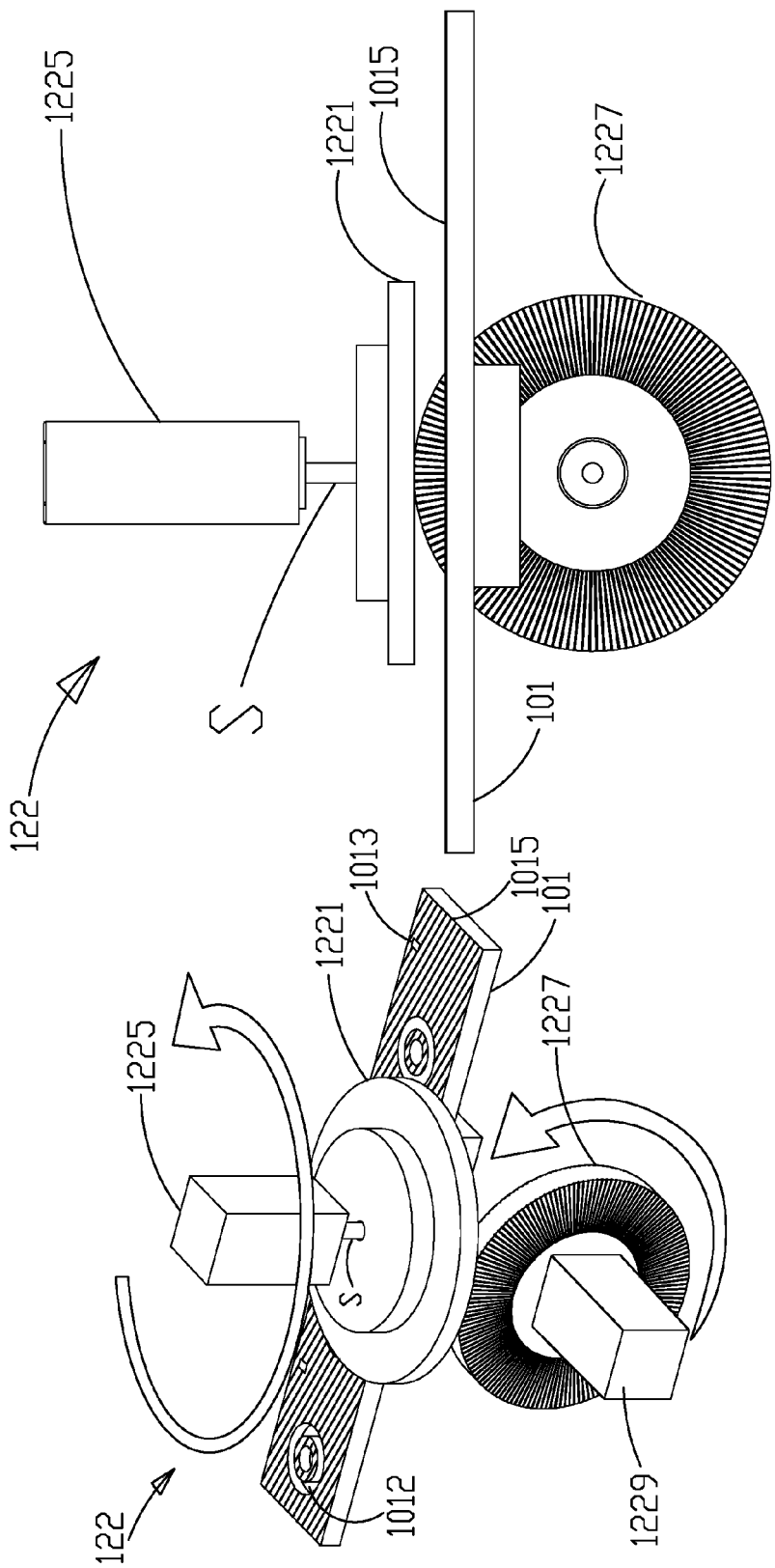
FIG. 11A shows a stereoscopic diagram of the electrode machining unit of the electrochemical machining module according to an embodiment of the present invention.
FIG. 11B shows a side view of the electrode machining unit of the electrochemical machining module according to the embodiment of the present invention.

Please refer to FIGS. 11A and 11B, which show a stereoscopic diagram and a side view of the electrode machining unit of the electrochemical machining module according to an embodiment of the present invention. As described above, the electrochemical machining module 12 includes the electrode machining unit 122, as shown in FIG. 7. According to an embodiment of the present invention, the electrode machining unit 122 may include a machining electrode 1221, a first spin unit 1225, a cleaning unit 1227, and a second spin unit 1229. The machining electrode 1221 is disposed at the first spin unit 1225; the cleaning unit 1227 is disposed at the second spin unit 1229 and contacts the machining surface of the machining electrode 1221. The first spin unit 1225 spins the machining electrode 1221; the second spin unit spins the cleaning unit 1227. According to an embodiment of the present invention, the first spin unit 1225 and the second spin unit 1229 can be motors and the cleaning unit 1227 can be wheel brush.

According to the present embodiment, the machining electrode 1221 can be a disc-shaped electrode. The machining surface at the bottom of the machining electrode 1221 include no machining patterns. Instead, the machining surface of the machining electrode 1221 is a flat surface. The non-machining region of the material strip 101 can be pre-coated for forming an insulating layer 1015 on the non-machining region of the material strip 101. Nonetheless, the insulating layer 1015 does not cover the machining region of the material strip 101. Thereby, by using the machining electrode 1221, the electrochemical machining can be performed to the machining region not covered by the insulating layer 1015 for forming the components 1012. According to the present embodiment, the shaft S of the first spin unit 1225 and the shaft of the second spin unit 1229 spin continuously and hence spin the machining electrode 1221 and the cleaning unit 1227 continuously. Because the cleaning unit 1227 contacts the machining surface of the machining electrode 1221, when the cleaning unit 1227 spins, the products or dusts attached to the machining surface of the machining electrode 1221 can be brushed (removed) and thus cleaning the machining surface of the machining electrode 1221.

According to another embodiment of the present invention, the first and second spin units 1225, 1229 need not to spin continuously but spin intermittently. The details will be described as follows. After the machining electrode 1221 performs the electrochemical machining to the material strip 101 for a period, the first spin unit 1225 spins the machining electrode 1221 for moving the uncleaned machining surface of the machining electrode 1221 not to face the material strip 101. Meanwhile, the cleaned machining surface of the machining electrode 1221 will be moved to face the material strip 101 for performing the electrochemical machining. In addition, by using the second spin unit 1229 to spin the cleaning unit 1227, the uncleaned machining surface can be brushed. Alternatively, the machining surface at the bottom of the machining electrode 1221 may have a plurality of machining pattern units (not shown in the figures), each of the machining pattern units may be applied to perform the electrochemical machining in turns by spinning the machining electrode 1221 intermittently, and cleaning the surface of each of the machining pattern units in turns by spinning the cleaning unit 1227 intermittently.

To sum up, the present invention provides a continuous machining system, which uses a tape-and-roll type material strip as the base material. The material strip can be supplied continuously in coordination with the machining method using the electrochemical machining module and the separating module. The material strip is first supplied to the electrochemical machining module, which performs the electrochemical machining to the material strip continuously for forming a plurality of components on the material strip. Finally, the separating module is used for separating the plurality of components from the material strip. Thereby, the purposes of continuous machining and mass production may be achieved; the production speed may be increased and the machining costs may be reduced as well.

In addition, the continuous machining system according to the present invention further comprises the vibration reducing module, which includes the vibration reducing tank and the top tank. The vibration reducing tank accommodates the liquid. The material strip is hung in the vibration reducing tank and immersed in the liquid. Because the liquid is operated as the damper, the liquid can ease the vibration of the material strip. Furthermore, the liquid flows downwards to the vibration reducing tank continuously. Then the liquid is further drained from the vibration reducing tank continuously via the plurality of liquid draining holes at the bottom of the vibration reducing tank. Thereby, the liquid flows from the top of the vibration reducing tank to the bottom continuously and hence providing a stable downward-flowing pressure on the material strip for further easing vibration of the material strip. Consequently, the influence of vibration on the electrochemical machining precision of the material strip machined by the electrochemical machining module may be minimized.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A continuous machining system, comprising:
   an electrochemical machining module, performing an electrochemical machining to a material strip, and forming a plurality of components on said material strip;
   a separating module, separating said plurality of components from said material strip; and
   a vibration reducing module, located between said electrochemical machining module and said separating module, and comprising:
   a vibration reducing tank, accommodating a liquid, said material strip being hung in said vibration reducing tank and immersed in said liquid, and said vibration reducing module having a plurality of liquid draining holes located at the bottom of said vibration reducing tank; and
   a top tank, located on the top of said vibration reducing tank, having a plurality of liquid supplying holes located at the bottom of the top tank, said plurality of liquid supplying holes communicating with said vibration reducing tank, said liquid flowing downward to said vibration reducing tank via said plurality of liquid supplying holes, and said liquid being drained from said vibration reducing tank via said plurality of liquid draining holes located at the bottom of said vibration reducing tank.

2. The continuous machining system of claim 1, wherein said separating module performs a forging process for separating said plurality of components from said material strip.

3. The continuous machining system of claim 2, wherein said separating module performs said forging process for separating said plurality of components from said material strip, and the thickness of said material strip at the locations where said separating module performs said forging process to said plurality of components is thinner than the thickness of said material strip without said electrochemical machining.

4. The continuous machining system of claim 1, further comprising a liquid supplying module supplying said liquid to said top tank.

5. The continuous machining system of claim 1, wherein said vibration reducing module further comprises:
   a bottom tank, disposed at the bottom of said vibration reducing tank, and having an outlet; and
   a liquid draining plate, disposed between said bottom tank and said vibration reducing tank, having said plurality of liquid draining holes, and said plurality of liquid draining holes communicating with said bottom tank.

6. The continuous machining system of claim 5, further comprising a liquid supplying module supplying said liquid to said top tank, wherein said liquid supplying module further includes a pump connected with said outlet of said bottom tank and supplying said liquid to said top tank.

7. The continuous machining system of claim 1, wherein said vibration reducing module further comprises a limiting module disposed in said vibration reducing tank, and located on both sides of a conveying path of said material strip.

8. The continuous machining system of claim 7, wherein said limiting module includes:
   at least one first positioning pillar, disposed in said vibration reducing tank, and located on a first side of said conveying path of said material strip;
   at least one second positioning pillar, disposed in said vibration reducing tank, and located on a second side of said conveying path of said material strip; and
   a plurality of limiting plates, disposed at said first positioning pillar and said second positioning pillar, respectively.

9. The continuous machining system of claim 8, wherein said plurality of limiting plates are U-shaped and straddling said first positioning pillar and said second positioning pillar.

10. The continuous machining system of claim 8, wherein said limiting module further includes:
    a first fixing plate, disposed inside said vibration reducing tank, located on a first side of said vibration reducing tank, having at least one first positioning groove and at least one second positioning groove, a first end of said first positioning pillar passing through said first positioning groove of said first fixing plate, and a first end of said second positioning pillar passing through said second positioning groove of said first fixing plate; and
    a second fixing plate, disposed inside said vibration reducing tank, located on a second side of said vibration reducing tank, having at least one first positioning groove and at least one second positioning groove, a second end of said first positioning pillar passing through said first positioning groove of said second fixing plate, and a second end of said second positioning pillar passing through said second positioning groove of said second fixing plate.

11. The continuous machining system of claim 1, and further comprising:
    a first guiding module, disposed on a first side of said vibration reducing tank, and guiding said material strip to enter said vibration reducing tank; and
    a second guiding module, disposed on a second side of said vibration reducing tank, and guiding said material strip passing through said vibration reducing tank to enter said separating module.

12. The continuous machining system of claim 1, wherein said electrochemical machining module includes:
    a first spin unit;
    a machining electrode, disposed at said first spin unit, and said first spin unit spinning said machining electrode;
    a second spin unit; and
    a cleaning unit, disposed at said second spin unit, contacting said machining electrode, and said second spin unit spinning said cleaning unit.

13. The continuous machining system of claim 12, wherein said machining electrode is a disc-shaped electrode.

14. The continuous machining system of claim 12, wherein said cleaning unit is a wheel brush.

15. The continuous machining system of claim 1, and further comprising a pre-machining module forming at least one positioning hole on said material strip, and said electrochemical machining module comprising a positioning unit for positioning at least one machining region of said material strip according to said positioning hole, performing said electrochemical machining to said machining region, and forming said plurality of components in said machining region.

16. The continuous machining system of claim 1, wherein the structure of said plurality of components is a patterned structure without holes.

* * * * *